United States Patent [19]

Sato et al.

[11] 4,271,246
[45] Jun. 2, 1981

[54] METHOD FOR PRODUCING A MULTICOLOR OPTICAL FILTER

[75] Inventors: Masamichi Sato; Kenji Matsumoto, both of Asaka, Japan

[73] Assignee: Fuji Photo Film Co., Ltd., Minami-ashigara, Japan

[21] Appl. No.: 52,704

[22] Filed: Jun. 28, 1979

[30] Foreign Application Priority Data

Jun. 28, 1978 [JP] Japan .................. 53-78313

[51] Int. Cl.³ .................. G03C 5/04; G03C 5/00; G03C 7/00
[52] U.S. Cl. .................. 430/7; 430/24; 430/27; 430/28; 430/365; 430/366; 430/376; 430/948; 430/952; 350/317
[58] Field of Search .................. 430/7, 24, 27, 28, 365, 430/366, 367, 375, 948, 952, 376; 350/316, 317

[56] References Cited

U.S. PATENT DOCUMENTS

| | | | |
|---|---|---|---|
| 2,628,902 | 2/1953 | Raibourn | 430/365 |
| 2,683,769 | 7/1954 | Banning | 430/24 |
| 2,704,252 | 3/1955 | Gresham | 430/7 |
| 2,820,090 | 1/1958 | Mountain | 350/317 |
| 3,592,649 | 7/1971 | Parsonage et al. | 430/321 |
| 4,081,277 | 3/1978 | Brault et al. | 430/320 |

*Primary Examiner*—J. Travis Brown
*Attorney, Agent, or Firm*—Sughrue, Rothwell, Mion, Zinn and Macpeak

[57] ABSTRACT

A method for producing a multicolor optical filter, which comprises exposing a photographic material comprising a support and at least one black-and-white silver halide emulsion layer to light through a first pattern; developing the exposed emulsion layer with a first coupler-containing color developer to form a pattern of a first dye; then exposing an unexposed portion of said emulsion layer to light through a second pattern; developing the exposed area with a second coupler-containing color developer to form a pattern of a second dye; optionally repeating exposure and development to form patterns containing dyes of third and subsequent colors, thereby to form color patterns of at least two colors; and subjecting the product to a silver removal treatment after the final color development step.

20 Claims, 11 Drawing Figures

METHOD FOR PRODUCING A MULTICOLOR OPTICAL FILTER

BACKGROUND OF THE INVENTION

1. Field of the Invention

This invention relates to a method for producing a multicolor optical filter. Particularly, it relates to a method for producing a multicolor optical filter used in a color television-camera tube, a color solid state image sensor, etc.

2. Description of the Prior Art

Multicolor optical filters in the form of a multicolored stripe or a multicolored mosaic are used in color television-camera tubes or color solid state image sensors typified by charge coupled devices (CCD) or charge injection devices (CID). Usually, the multicolor optical filter is composed of three colors of: red, green and blue or cyan, magenta and yellow regularly aligned in a stripe or mosaic pattern. The color make-up is, however, not limited to these two 3-color combinations and the filter may be composed of two colors or four or more colors.

Conventionally known multicolor optical filters include dichroic mirrors as disclosed, for example, in Japanese Patent Publication No. 8590/65 and Japanese Patent Application (OPI) No. 3440/77 (The term "OPI" as used herein refers to a "published unexamined Japanese patent application"), and dyed polymeric materials as disclosed, for example, in Japanese Patent Application (OPI) Nos. 37237/72, 63739/73 and 66853/73 and Japanese Patent Publication No. 248/78.

Manufacturing of these multicolor optical filters requires forming a photoresist corresponding to the pattern of each color, imagewise exposure wherein the mask must be precisely aligned, development, coloration or decoloration, removal of the resist, etc. Since these steps must be performed a number of times (usually, at least 3 times), the processes are very complicated and troublesome. Moreover, additional measures are required to obtain a superior multicolor optical filter. For example, when a multicolor optical filter is to be produced by repeating a process consisting of the formation of a relief pattern by coating a photoresist, imagewise exposure and development and coloration, care must be taken to ensure that a colored pattern formed in the coloration step in the previous process is not colored a different color in the subsequent processing. For this purpose a non-dyeing protective layer is sometimes applied at intervals between the coloring steps. As a result, the manufacturing becomes complex and the resulting multicolor optical filter becomes very expensive.

In order to overcome these defects, efforts have been made to use a silver halide color photographic material (a color film) in the optical filter manufacturing process. Such a process generally comprises exposing a coupler-incorporated color film or a color film adapted for development with a coupler-containing developer to light through a red, green and blue or a cyan, magenta and yellow master film, forming a color filter composed of cyan, magenta and yellow, or red, green and blue by photographic development using a coupler-free developer or a coupler-containing developer, bonding the color filter to a circuit glass plate, etc., for use as a faceplate of a television-camera tube, and further bonding the thin glass plate to the filter to produce the desired multicolor optical filter.

This method is described in detail by reference to FIG. 1 which shows the cross-section of a color film 10 composed of a minimum number of required layers. The color film 10 consists of a transparent base 11, a primer layer 12, a red-sensitive emulsion layer 13, an intermediate layer (anti-diffusion layer) 14, a green-sensitive emulsion layer 15, an intermediate layer (anti-diffusion layer) 16, a blue-sensitive emulsion layer 17 and a protective layer 18. Color films in actual use may include other layers or consist of the same layers arranged in different orders. Each of the emulsion layers has a thickness of about 5 $\mu$m and each intermediate layer has a thickness of about 1 to 2 $\mu$m. When this color film is exposed to red, green and blue lights (in the drawing, designated as R, G and B, respectively) as shown in FIG. 2 and processed, a cyan pattern 21 is formed in the red-sensitive layer, a magenta pattern 22 is formed in the green-sensitive layer, and a yellow pattern 23 is formed in the blue-sensitive layer, if the color film is of the coupler-incorporated type. As shown in FIG. 3, the color filter obtained is bonded to the surface of a circular glass plate 30 by an adhesive layer 31. A thin glass plate 33 is bonded to the color film 10 via an adhesive layer 32. Furthermore, a transparent electrode 34 and an optically conductive layer 35 are provided on the glass plate 33. Three color patterns 21, 22 and 23, such as those shown in FIG. 2, are formed on the color film 10.

In this manner, a faceplate of a color television-camera tube or a color solid state image sensor having the multicolor optical filter formed thereon is made. The above method, however, has the following defects. In commercially available color films, the size of the silver halide grains in the emulsions are considerably large, and the emulsion layer is of a multilayer structure having sensitivities to individual spectral wavelength regions. Hence, the resolving power of the color films is not so high. While it is expected that color films containing a Lippmann emulsion, which is a fine grain emulsion, would have some degree of high resolution, even if such a fine grain emulsion is used a complex multilayer arrangement of emulsion layers is required. Thus, the manufacturing process naturally becomes complex and expensive. Furthermore, as a result of the necessity of a complex multi-layered film structure, the resolving power of the resulting pattern is limited, and when a coupler-incorporated material is developed, the unreacted coupler remains in the emulsion layer and on standing for long periods of time the unreacted coupler is likely to color.

SUMMARY OF THE INVENTION

It is an object of this invention to provide a method for producing a multicolor optical filter particularly suitable for use in color television-camera tubes or color solid state image sensors at low cost through simplified processing.

It has been found that a multicolor optical filter having a very high resolving power, which cannot be realized using conventional color films, can be obtained using a black-and-white photographic material having a known emulsion layer of fine particulate silver halide grains and combining it with a method of development using a coupler-containing color developer.

Accordingly, the present invention provides:

A method for producing a multicolor optical filter which comprises exposing an emulsion layer of a photographic material to light through a pattern corresponding to the pattern of the first color desired, said photographic material being composed of a support and at least one black-and-white silver halide emulsion layer; developing the exposed emulsion layer with a coupler-containing color developer to form a pattern containing a dye of a first color; exposing an unexposed portion of the same photographic material containing silver halide to light through a pattern corresponding to the pattern of the second color desired; developing the exposed area with a coupler-containing color developer to form a pattern containing a dye of a second color; optionally repeating said exposure and development to form patterns containing dyes of third and subsequent colors, to thereby form at least two color patterns; and subjecting the product to silver removal treatment after the final color development.

Further, in this invention after at least one color developing step other than the last one, a treatment may be performed which substantially inhibits or prevents further color development of the exposed and developed area(s).

More specifically, as a second embodiment of this invention, after at least one color development step other than the last one black-and-white development is performed until development reaches saturation. Further, in a third embodiment of this invention after at least one color development step other than the last one the latent image is subjected to a treatment with a latent image-destroying solution capable of dissolving a development center Ag in the silver halide emulsion layer and/or transforming the development center Ag to an Ag compound.

DETAILED DESCRIPTION OF THE INVENTION

The method of this invention is described in more detail below with reference to the accompanying drawings.

Figure 1:
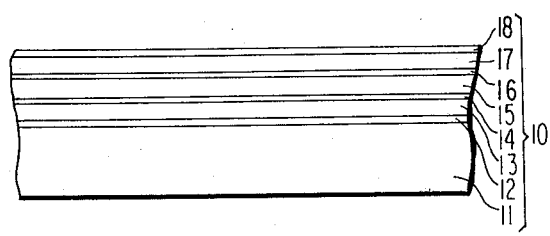
FIG. 1 is a cross-sectional view of one example of a color photographic film.
Figure 2:
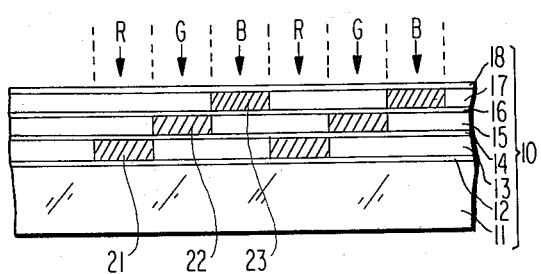
FIG. 2 is a cross-sectional view showing the image layer of a multilayer optical filter prepared from the color photographic film in FIG. 1.
Figure 3:
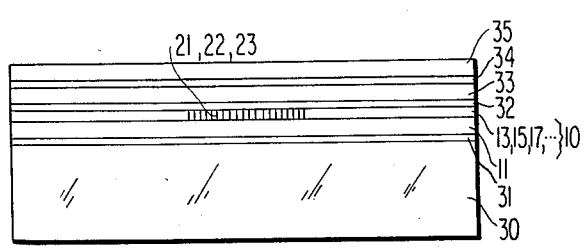
FIG. 3 is a cross-sectional view of one example of a faceplate of a television-camera tube prepared by bonding a color film having a multicolor optical filter image formed therein to a circular glass plate.
Figure 4:
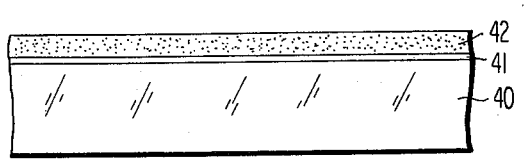
FIG. 4 is a cross-sectional view of the black-and-white photographic material used in this invention.

Referring to FIG. 4, a subbing layer 41 is formed, if desired, on a support 40 on top of which is provided a black-and-white silver halide emulsion layer 42. If the support 40 is to be the support for the desired optical filter, it must be transparent. However, if the color filter layer is formed on the support and transferred to another transparent support for the optical filter, the support may be transparent, semi-transparent or non-transparent in view of its temporary nature. The support may be a plate, sheet or film and made of, for example, a plastic (e.g., polyethylene terephthalate, polystyrene, polycarbonate or cellulose acetate), glass, quartz, sapphire, etc. Furthermore, the support itself may have another utility such as a faceplate of a television-camera tube.

The subbing layer 41 in this embodiment is a layer of a material which firmly adheres to both the support 40 and the silver halide emulsion layer 42. Examples of the material used in the subbing layer 41 include gelatin, albumin, casein, cellulose derivatives, starch derivatives, sodium alginate, polyvinyl alcohol, polyvinyl pyrrolidone, acrylic acid copolymers, and polyacrylamide. The subbing layer is as thin as possible and is usually in the range of about 0.01 to 1 $\mu$m and preferably about 0.05 to 0.5 $\mu$m thick.

To produce an effect similar to a subbing layer, a very small amount of a hydrophilic material such as chromium may be adhered to the support. Adhesion of chromium or the like to the support is performed by vacuum deposition, sputtering, ion plating, etc., to an extent that the optical density of the deposit is not more than 0.1 and preferably not more than 0.08.

The silver halide emulsion coated on the support either directly or through the subbing layer may be a conventional black-and-white silver halide emulsion obtained by dispersing silver halide in a water-soluble binder. In the present invention, fine grain emulsions are especially suitable and a so-called Lippmann emulsion in which the average grain size of the silver halide is not more than about 0.1 $\mu$m is especially desirable. The weight ratio of silver halide to the water-soluble binder can vary between about 1:6 to about 8:1. Substantially any silver halide can be used in the present invention with suitable examples being silver chloride, silver bromide, silver iodide, silver chlorobromide, silver iodobromide, silver chloroiodide, and silver chloroiodobromide. Examples of the water-soluble binder are gelatin, albumin, casein, cellulose derivatives, agar, sodium alginate, sugar derivatives, polyvinyl alcohol, polypyrrolidone, and polyacrylamide. If required, a mixture of at least two miscible binders exemplified above may be used. The thickness of the silver halide emulsion layer 42 after drying is preferably about 0.8 $\mu$m to about 10 $\mu$m.

If required, an antihalation layer may be provided on the back of the support 4 of the so-formed photographic material.

Figure 5:
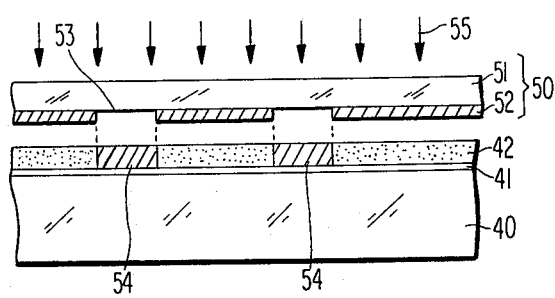
FIG. 5 is a cross-sectional view showing the first color image formed by exposing the black-and-white photographic material in FIG. 4 through a photomask and developing it with a coupler-containing color developer.

As shown in FIG. 5 the resulting photographic material is subjected to imagewise exposure 55 through a photomask 50 in a pattern corresponding to the first color pattern of the multicolor optical filter, for example, in a striped or mosaic pattern of cyan color.

The photomask used may be of any construction. For example, a chromium mask in which chromium forms the light-impervious (opaque) portion 52 on a glass plate 51 and transparent pattern 53 imagewise corresponds to the pattern of the first color may be used.

For exposure, any light source which emits light of wavelengths to which the silver halide emulsion layer is sensitive may be used. For example, a light source which will emit light of wavelength of white light is used. The silver halide emulsion layer may be exposed by so-called contact exposure in which the photomask is superposed on the emulsion layer 42 as shown in FIG. 5 and uniformly irradiated, or by projection exposure method in which imagewise exposure is effected through a lens system.

The exposed photographic material is developed with a first coupler-containing color developer, for example, a color developer containing a cyan coupler and a pattern 54 composed of a cyan dye and silver grains is formed in the exposed area. After the first development, the photographic material is washed with water and if required dried.

Figure 6:
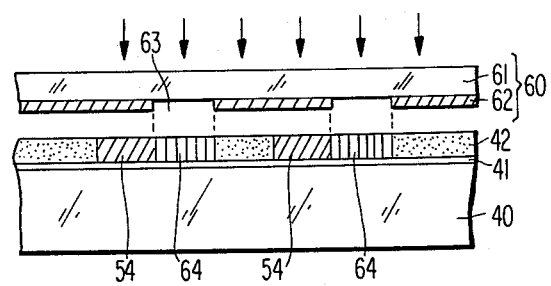
FIG. 6 is a cross-sectional view showing formation of the second color image.

Then, as shown in FIG. 6, an unexposed portion of the silver halide emulsion layer adjacent the cyan pattern 54 is exposed through a photomask 60 in a pattern corresponding to a second color, for example, magenta. The photomask 60 may be a chromium mask as described above in which the transparent support 61 bears a light-impervious chromium pattern 62 and a transparent pattern 63 imagewise corresponding to the second color pattern. The exposed photographic material is then developed with a second coupler-containing color developer such as a color developer containing a magenta coupler and a pattern 64 of a magenta dye and silver grains is formed adjacent the pattern 54 of the cyan dye and silver grains already formed. After the second development, the photographic material is washed with water and if desired dried.

Figure 7:
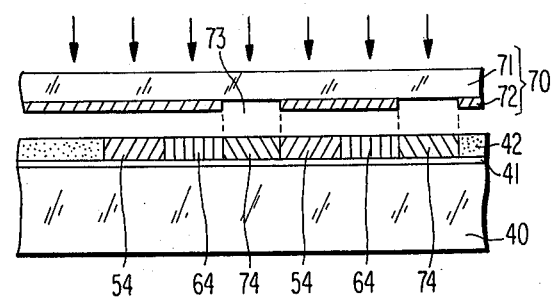
FIG. 7 is a cross-sectional view showing the formation of a third color image.

Subsequently, in the same manner as above, the unexposed portion between the patterns 54 and 64 is imagewise exposed in a pattern corresponding to a third color, for example, yellow, as shown in FIG. 7, and developed with a yellow coupler-containing color developer. As a result, a pattern 74 of a yellow dye and silver grains is formed adjacent the patterns 54 and 64. In FIG. 7, the reference numeral 70 represents a third photomask which is composed of a transparent support 71, a light-impervious chromium pattern 72 and a transparent pattern 73 imagewise corresponding to the pattern of the third color.

The coupler-containing color developer solution used in this invention is generally an aqueous alkaline solution (pH at least 8, preferably 9 to 12) containing any of a variety of color couplers and a developing agent whose oxidation product reacts with a color coupler to form a colored product. For example, the developing agent may be a p-phenylenediamine such as N,N-diethyl-p-phenylenediamine sulfate or N,N-diethyl-3-methyl-p-phenylenediamine hydrochloride. The aqueous solution usually contains salts such as sodium sulfite, pH adjusting agents or buffers such as sodium hydroxide, sodium carbonate or sodium phosphate, and conventional antifoggants such as alkali halides (e.g., potassium bromide). Addition of an antifoggant to the color developer solution is the most preferred embodiment of the present invention.

Examples of couplers which may be used in conjunction with the present invention include yellow couplers such as disclosed in U.S. Pat. Nos. 3,510,306 and 3,619,189 and Japanese Patent Publication Nos. 33775/65 and 3664/69; magenta couplers such as disclosed in German Patent Application (OLS) No. 2,016,587, U.S. Pat. Nos. 3,152,896 and 3,615,502 and Japanese Patent Publication No. 13111/69; and cyan couplers such as disclosed in U.S. Pat. Nos. 3,002,836 and 3,542,552 and British Pat. No. 1,062,190. These couplers are only representative and it will be readily apparent to the artisan that any of a wide variety of color couplers can be used in this invention. The above exemplified known couplers form cyan, magenta and yellow colors. Depending upon the purpose or use of the optical filter, it is of course possible to use color developer solutions containing couplers of other colors.

Usually, a hardening bath is used prior to color development step. An example of the hardening bath is an aqueous solution containing an aldehyde which reacts with gelatin to harden it.

Figure 8:
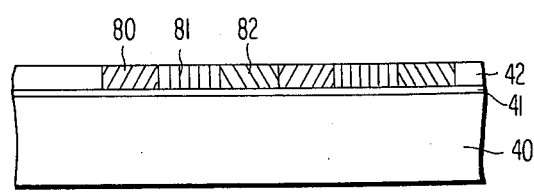
FIG. 8 is a cross-sectional view of the photographic material and color images after silver removal.

The resulting photographic material in which the pattern 54 containing the cyan dye, the pattern 64 containing the magenta dye and the pattern 74 containing the yellow dye are regularly aligned so that they border on one another is then subjected to a silver removal treatment in which the siliver grains and/or the residual silver halide grains are removed from the emulsion using known techniques, e.g., bleaching and fixing. As a result, a multicolor optical filter is formed which consists of a cyan pattern 80, a magenta pattern 81 and a yellow pattern 82 regularly aligned in a stripe or mosaic pattern as shown in FIG. 8.

The silver removal treatment employed in conjunction with this invention is used to remove silver grains and/or silver halide grains in conventional color photographic processing, and conventional bleaching and/or fixing solutions can be employed. Representative bleaching (oxidizing) agents include potassium ferricyanide, silver-EDTA complex salt and bichromate salts, and re-halogenating agents such as potassium bromide, etc. If a fixing agent is used for silver halide removal, it may contain any silver halide solvent (e.g., sodium thiosulfate, sodium thiocyanate) generally known in the art. The solution containing the fixing agent may also contain a preservative (e.g., sodium sulfite), a pH buffer (e.g., boric acid), a pH adjusting agent (e.g., acetic acid), a chelating agent, etc. One example of a suitable silver removal treatment is a so-called monobath bleach-fixing solution, for example, a mixed solution of sodium thiosulfite and potassium ferricyanide, and a mixed solution of iron-EDTA and sodium thiosulfate.

In the optical filter described hereinabove, the individual color patterns are arranged so that they closely border one another. Needless to say, it is also possible to produce a multicolor optical filter which contains an unexposed area between the individual patterns without close contact of those patterns.

If the patterns of the individual colors have the same shape such as a stripe of the same width, the photomasks 50, 60 and 70 shown in FIGS. 5 to 7 need not be different from one another. Thus, in this case, patterns of different colors can be successively formed by imagewise exposure using the same photomask.

As described hereinabove, according to the method of this invention, a photographic material containing a conventional black-and-white emulsion layer having fine particles of silver halide is used and the patterns of the individual colors are formed in the same emulsion layer by repeating imagewise exposure and color development with a coupler-containing color developer solution several times as desired to thereby form a multicolor optical filter. Thus, the method of this invention is quite different from the conventional tehcnique in which different colors are formed in the individual emulsion layers of a color film containing a plurality of emulsion layers having different spectral sensitivities and which contains color couplers or is developable with a coupler-containing color developer. The resulting multicolor optical filter has a very high resolution and even line widths of 1 μm can be easily obtained.

Figure 9:
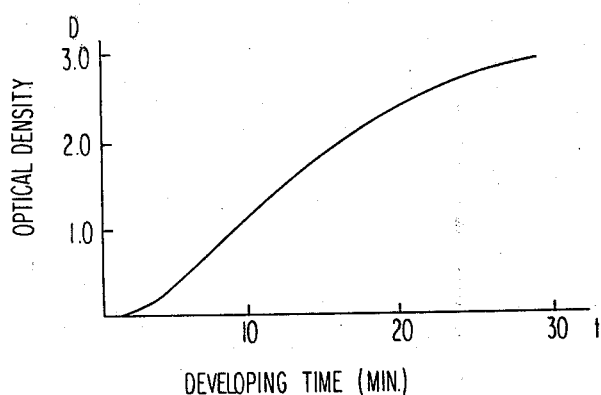
FIG. 9 is a graph of color development time versus optical density.

It has been found, however, that the following problems arise when practicing the embodiment of this invention described above. Specifically, the processing time tends to be too long because the color development generally proceeds slowly. The development rate in such a method becomes slower with the development time as shown in FIG. 9, and development does not quickly reach a saturation point. The development can be saturated by extending development to 30 to 40 minutes in each development step, but for processing a plurality colors, the overall processing time becomes extremely long.

If the first color (e.g., cyan) development time is limited to 15 minutes to shorten the developing time, during the second color (e.g., magenta) development the magenta dye will form in the first color pattern (the area 54 in FIGS. 5 to 7) which should consist only of cyan dye. Thus, the cyan pattern becomes a mixture of the cyan and magenta. Such a mixed color is generally not desirable although it can be effective in special cases as described hereinbelow.

Figure 10:
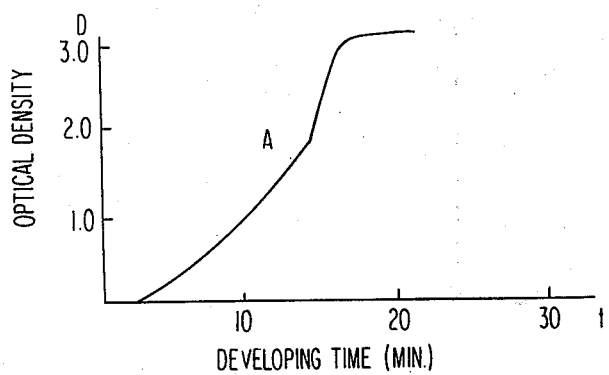
FIG. 10 is a graph of developing time versus optical density when color development is performed to a certain extent followed by black-and-white development.

According to a second embodiment of this invention, development of the first color is stopped as soon as a suitable color density is obtained (e.g., after 15 minutes) as shown in FIG. 10 (point A), and then rapid black-and-white development is carried out. As a result, undeveloped latent image remaining in the area of the first color is developed by this rapid black-and-white developer in a short period of time (about 5 minutes at the longest). Thus, development saturation is quickly reached, and active silver no longer exists in the exposed area. Color development in the first color pattern will not substantially proceed any further and the second color (magenta dye) and the third color (the yellow dye) cannot form in the first color pattern. When a three or more color pattern is to be formed, formation of mixed color patterns can be prevented by repeating the same step after the second and subsequent color development steps. Such a treatment, however, is unnecessary for the color pattern formed last because there is no possibility of forming a mixed color in that area, there being no additional color treatments.

The photographic material subjected to color development in the above manner is then subjected to silver removal as in the embodiment described earlier. Thus, a multicolor optical filter is formed in which the patterns of the individual colors are aligned regularly in the form of a stripe or mosaic.

It is necessary that the black-and-white developer solution used in this second embodiment should have a developing speed at faster than that of the color developer solution. Developing agents well known in the art can be used for this purpose. Examples are hydroquinone, pyrogallol, 1-phenyl-3-pyrazolidone, p-aminophenol and ascorbic acid. As required, the developer may contain known agents or compositions such as alkaline agents (e.g., sodium hydroxide, sodium carbonate), pH adjusting agents or buffers (e.g., acetic acid, boric acid), antifoggants (e.g., potassium bromide), and preservatives (e.g., sodium sulfite). Rapid developer solutions or high contrast developer solutions known in the field of photography are most preferred for such a purpose. The rapid developer solutions and the high contrast developer solutions are described, for example, in *Manual of Scientific Photography,* Second Volume, new edition, published Dec. 20, 1959 by Maruzen Co., Ltd., pp. 126 and 127.

Figure 11:
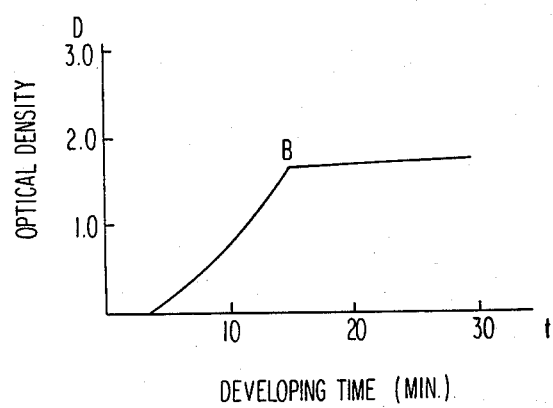
FIG. 11 is a graph of developing time versus optical density when the latent image is destroyed after color development.

According to still another embodiment of this invention, color development is stopped, e.g., after 15 minutes when a suitable optical density has been obtained as shown in FIG. 11 (point B) and the latent image is destroyed to completely stop the progress of development. The term "destroying" as used herein means dissolving and removing the development center Ag of the latent image or transforming the Ag to an Ag compound such as AgX (AgBr, AgCl, etc.) and $Ag_2SO_4$, whereby Ag as the development center disappears. Subsequently, development of the second and subsequent colors is performed. To destroy the latent image and stop its development, latent image-destroying solutions which will destroy latent images and will not dissolve the silver halide in the unexposed areas and the dyes are used. These solutions may be selected from reducing agents and bleaching agents known in the photographic field, such as an aqueous solution of sulfuric acid and an alkali metal bichromate and an ammonium salt, or an aqueous solution of a ferricyanide compound and potassium bromide as described in C. E. K. Mees, *The Theory of the Photographic Process* published by the Macmillan Company (1954), pp. 738–744 and conventional bleaching agents used in the reversal bath described in *Photographic Chemistry,* Vol. 1 translated from French by Keith Hornsby, Fountain Press, London, pp. 173 to 183. As a result, the latent image is destroyed, for example, by dissolving the silver grains formed by color development and the undeveloped silver nucleus, or by rehalogenation of the silver. Thus, silver constituting a development nucleus is eliminated from the pattern of the first color. Hence, unless such a pattern is again imagewise exposed, the dyes formed in the second and third color areas in the subsequent development steps do not form in the pattern of the first color, and no mixed color can occur. When three or more color patterns are formed, formation of a mixed color in the resulting patterns can be inhibited by repeating the same step after color development of the second and subsequent colors (no such treatment is required in the pattern finally formed because there is no possibility of the formation of a mixed color).

The resulting photographic material including the independent patterns containing the individual dyes and the silver halide left after destroying both the silver formed by development and the latent image is then subjected to silver elimination in the same manner as described hereinabove. Consequently, a multicolor optical fiber is formed in which the patterns of the individual colors are regularly aligned in the form of a stripe or mosaic.

According to the third embodiment of this invention, a multicolor optical filter of the structure described below can also be produced. Specifically, a pattern of the first color is color-developed (for example, red), and the latent image is destroyed. Then, a pattern of the second color is made to partially overlap the pattern of the first color and is exposed imagewise, followed by color development of the pattern of the second color (for example, green). Thus, the overlapping portion between the first color pattern and the second color pattern becomes impervious to light of red color, light of green color and light of blue color. Thus, a so-called black stripes or outlines can be formed between the pattern of the first color and the pattern of the second color. By performing the same treatment between the pattern of the second color and the pattern of the third color (for example, blue color), a multicolor optical filter with black stripes can be obtained in which the individual patterns are divided by black stripes or outlines.

Needless to say, such a black stripes or outlines can also be formed in all of the embodiments of the present invention by providing a black pattern between the patterns of the individual colors at the time the patterns are formed.

In the three embodiments described hereinabove, measures are taken to not form a mixed color in each of the patterns. There is, however, an advantage to a mixed color as shown below. For example, in a red pattern the red dye generally permits transmission of red light and also of light of shorter wavelengths than red. Thus, when a multicolor optical filter of red, green and blue is to be formed by this invention, it is necessary to inhibit transmission of light of shorter wavelengths. This can be achieved by developing the latent image remaining in the red pattern with a color developer solution containing a yellow coupler after performing the color development of the red color in accordance with the first embodiment, or after destroying the latent image which remaining after color-developing in red in accordance with the third embodiment, and again imagewise exposing the pattern. As a result, a mixed color of yellow which shields light of shorter wavelengths is formed in the red pattern. Accordingly, such a red pattern can permit transmission of only red light. Such a pattern can also be produced by incorporating a yellow coupler in a red color coupler-containing developer solution in all of the embodiments of this invention.

In such an embodiment utilizing a mixed color, it is possible to produce a multicolor optical filter of this invention by forming a green pattern and a blue pattern, for example, in the same way as in the first to third embodiments after the formation of the red pattern.

A conventional cross type multicolor optical filter having a yellow pattern, a cyan pattern, an uncolored pattern and a green pattern in the area overlapping the yellow stripe pattern and the cyan stripe pattern can be produced, for instance, by re-halogenizing the latent image remaining after the formation of a yellow stripe pattern in accordance with the third embodiment discussed above and forming a cyan stripe pattern overlapping the yellow pattern at a specified angle by a second color development followed by silver removal.

In the above description, a cyan or red developer is used as the first developer, a magenta or green developer is used as the second developer, and a yellow or blue developer is used as the third developer. The order of application of these developers is optional. Of course, the invention is not limited to three color development steps, and two or at least four color developing steps may be employed in any sequence as determined by the purpose and use of the optical filter.

When the support of the multicolor optical filter obtained by the method of this invention is a circular glass plate for a faceplate of a television-camera tube, it can be directly used for a television-camera tube. When the support is a film or a thin glass plate (for example, with a thickness of about 0.1 to 0.2 mm), it can be used as bonded to a circular glass plate by means of an epoxy-type adhesive, for example.

According to a further embodiment of this invention, the support of the photographic material is treated such that after processing it releases the silver halide emulsion layer formed on it, as described in Japanese Patent Application (OPI) No. 132930/74 is used, and multicolor filter patterns are formed in the emulsion layer in accordance with the embodiments described above. The emulsion layer may then be transferred to a circular glass plate for use as a faceplate of a television-camera tube.

The following Examples illustrate the present invention in greater detail.

EXAMPLE 1

Using 50 g of gelatin and 188 g of silver bromide, 1,400 ml of a silver bromide emulsion (average grain size about 0.06 $\mu$m) was prepared in a customary manner. To the resulting emulsion was added 0.25 g of 4-methyl-2,3-diethoxythiazolocarbocyanine iodide to sensitize the emulsion optically so that it had sensitivity to light of wavelengths of 510 nm to 530 nm. The emulsion was coated on a circular borosilicate glass plate having a diameter of 1 inch and a thickness of 2.5 mm to a dry thickness of about 3 $\mu$m, and dried to afford a photographic material. The photographic material was brought into intimate contact with a chromium mask for a stripe filter having a transparent stripe with a width of 20 $\mu$m and a pitch of 60 $\mu$m, and exposed to glow light (tungsten-filament lamp). The exposed photographic material was dipped for 2 minutes in a 5% aqueous solution of formaldehyde to preharden it, washed with water for 3 minutes, and developed at 24° C. for 10 minutes with a cyan color developer solution having the following formulation.

Cyan Color Developer Solution

Diethyl-p-phenylenediamine Hydrochloride: 3 g
Sodium Sulfite: 5 g
Sodium Carbonate: 60 g
Potassium Bromide: 2 g
Water to make: 1 l To the developer solution was added 50 ml of methanol having 1 g of m-hydroxybiphenyl dissolved in it.

The developed photographic material was washed with water for 5 minutes, and developed at 24° C. for 5 minutes with a developer of the following formulation to saturate the development of the exposed portion (to inhibit further progress of the development).

Developer

1-Phenyl-3-pyrazolidone: 0.5 g
Sodium Sulfite (anhydrous): 50 g
Hydroquinone: 12 g
Sodium Carbonate Monohydrate: 60 g
Potassium Bromide: 2 g
Benzotriazole: 0.2 g
1-Phenyl-5-mercaptotetrazole: 5 mg
Phenazine-2-carboxylic acid: 1 g
Water to make: 1 l Then, the photographic material was dipped for 2 minutes in a stop bath of the following formulation, washed with water for 5 minutes, and then dried thereby to obtain a pattern of a mixture of cyan dye and silver.

Stop Bath

28% Acetic Acid: 32 ml
Sodium Sulfate: 45 g
Water to make: 1 l

Then, the same chromium mask as above was used, and positioned so that its transparent portion was located immediately adjacent the above cyan pattern, and the photographic material was exposed in the same way as above, and developed at 24° C. for 10 minutes with a magenta color developer solution of the following formulation.

Magenta Color Developer Solution

Sodium Sulfite: 5 g
Diethyl-p-phenylenediamine Hydrochloride: 3 g
Sodium Carbonate: 60 g
Potassium Bromide: 2 g
Water to make: 1 l To the developer solution was added 50 ml of methanol having 1 g of 1-phenyl-3-methyl-5-pyrazolone dissolved in it.

The developed photographic material was washed with water for 5 minutes, and then developed at 24° C. for 5 minutes with the aforesaid black-and-white developer to saturate the development of the exposed area.

The developed material was dipped in the same stop bath as used in cyan development, washed with water for 5 minutes, and dried. Thus, magenta stripe was obtained adjacent the cyan stripe.

The same chromium mask as above was used, and positioned so that the transparent portion of the mask was located adjacent the magenta pattern. The photographic material was exposed, and developed at 24° C. for 10 minutes with a yellow color developer solution of the following formulation.

Yellow Color Developer Solution

Sodium Sulfite: 5 g
Diethyl-p-phenylenediamine Hydrochloride: 3 g
Sodium Carbonate: 60 g
Potassium Bromide: 2 g
Water to make: 1 l To the developer solution was added 50 ml of methanol having dissolved 1 g of p-nitroacetanilide in it.

The developed photographic material was washed with water for 5 minutes, dipped for 2 minutes in a bleach solution of the following formulation, and washed with water for 1 minute, followed by treatment with a fixation bath of the following formulation at 20° C. for 2 minutes.

Bleach Solution

Potassium Ferricyanide: 100 g
Potassium Bromide: 30 g
Water: 1,000 ml

Fixing Bath

Sodium Thiosulfate: 240 g
Sodium Sulfite: 3 g
Glacial Acetic Acid: 5 ml
Potassium Alum: 6 g
Water: 1,000 ml The photographic material was then washed for 5 minutes, and dried to obtain a color stripe filter of cyan, magenta and yellow with a width of 20 μm.

EXAMPLE 2

The same photographic material as in Example 1 was exposed and pre-hardened in the same way as in Example 1, and then developed with a cyan color developer "LDC-CI" (a product of Fuji Photo Film Co., Ltd.) for 3 minutes at 24° C. The developed material was washed with water for 2 minutes, and processed for 2 minutes with a bleach solution of the following formulation to remove the undeveloped latent image in the silver halide emulsion layer.

Bleach Solution

Potassium Bichromate: 1 g
Sulfuric Acid: 1 ml
Water: 1,000 ml

The processed photographic material was washed with water for 4 minutes, and dried. Then, it was subjected to the same second exposure as in Example 1, and developed with a magenta color developer "LDC-MI" (a product of Fuji Photo Film Co., Ltd.) at 24° C. for 3 minutes. The developed material was washed with water for 2 minutes, processed for 2 minutes with the above bleach solution, washed with water for 4 minutes, and dried.

The photographic material was then subjected to the same third exposure as in Example 1, and developed with a yellow color developer "LDC-YI" (a product of Fuji Photo Film Co., Ltd.) at 24° C. for 3 minutes. The developed photographic material was washed with water for 2 minutes, bleached for 2 minutes with a bleach agent "LDC-BI" (a product of Fuji Photo Film Co., Ltd.), washed with water for 1 minute, processed for 2 minutes with the same fixation bath as in Example 1, washed with water for 5 minutes, and dried. Thus, a 3-color striped filter of cyan, magenta and yellow without mixed color was obtained.

A striped filter of red, green and blue was produced under the same conditions as above except that a 3:1 mixture of "LDC-MI" and "LDC-YI" was used instead of "LDC-CI"; a 1:2 mixture of "LDC-CI" and "LDC-YI" instead of "LDC-MI"; and a 1:2 mixture of "LDC-CI" and "LDC-MI" instead of "LDC-YI".

While the invention has been described in detail and with reference to specific embodiments thereof, it will be apparent to one skilled in the art that various changes and modifications can be made therein without departing from the spirit and scope thereof.

What is claimed is:

1. A method of producing a multicolor optical filter, which comprises exposing a photographic material comprising a support and one black-and-white silver halide emulsion layer to light through a first pattern; developing the exposed emulsion layer with a first coupler-containing color developer to form a pattern of a first dye; then exposing an unexposed portion of said emulsion layer to light through a second pattern; developing the exposed area with a second coupler-containing color developer to form a pattern of a second dye; optionally repeating exposure and development to form patterns containing dyes of third and subsequent colors, thereby to form color patterns of at least two colors; and subjecting the product to a silver removal treatment after the final color development step.

2. The method of claim 1, wherein after at least one color development step other than the final one, said material is treated to substantially inhibit further color development in the color developed area.

3. The method of claim 2, wherein said treatment comprises black-and-white development.

4. The method of claim 2, wherein said treatment comprises destroying any undeveloped latent image present in the color developed areas.

5. The method of claim 1, wherein said silver removal treatment comprises fixing, bleaching or bleach-fixing.

6. The method of claim 1, wherein exposure and color development are performed three times to form independent patterns of cyan, magenta and yellow dyes.

7. The method of claim 1, wherein exposure and color development are performed three times to form independent patterns of red, green and blue dyes.

8. The method of claims 2, 3, or 4, wherein color development is conducted until a suitable color image density is obtained.

9. The method of claim 1, wherein said photographic material consists of a support and a black-and-white silver halide emulsion layer.

10. The method of claim 1, wherein prior to color development said emulsion layer is hardened.

11. The method of claim 9, wherein said emulsion layer is a Lippmann emulsion.

12. The method of claim 1, wherein said support is a circular glass plate used as a faceplate of a television-camera tube.

13. The method of claim 1, wherein the color patterns are separated by black outlines.

14. The method of claim 1, wherein patterns containing more than one dye are obtained by developing a partially-color developed area with a developer containing another color coupler.

15. The method of claim 4, wherein patterns containing more than one dye are obtained by re-exposing a color-developed and latent image-destroyed area and color-developing with a color developer containing another color coupler.

16. The method of claim 1 wherein said optional exposure and development are conducted in said one black-and-white emulsion layer.

17. The method of claim 6 wherein said optional exposure and development are conducted in said one black-and-white emulsion layer, thereby yielding said independent patterns of cyan, magenta, and yellow dyes.

18. The method of claim 1 wherein cyan, yellow and magenta dyes are formed in said one black-and-white silver halide emulsion layer, and said dyes are in patterns which are regularly aligned and border on one another.

19. The method of claim 18 wherein said cyan, yellow and magenta dyes exist over substantially the whole surface of said multicolor optical filter.

20. The method of claim 1, wherein said photographic material further comprises a subbing layer between said support and said one black-and-white silver halide emulsion layer.

* * * * *